(12) United States Patent
Choi

(10) Patent No.: US 9,552,096 B2
(45) Date of Patent: Jan. 24, 2017

(54) DISPLAY DEVICE AND MANUFACTURING METHOD THEREOF

(71) Applicant: SAMSUNG ELECTRONICS CO., LTD., Suwon-si (KR)

(72) Inventor: Woo Sub Choi, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/577,617

(22) Filed: Dec. 19, 2014

(65) Prior Publication Data

US 2015/0177897 A1 Jun. 25, 2015

(30) Foreign Application Priority Data

Dec. 20, 2013 (KR) ........................ 10-2013-0160683

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04103* (2013.01); *Y10T 29/49117* (2015.01)

(58) Field of Classification Search
CPC .................... G06F 3/044; G06F 3/0417; G06F 2203/04103

USPC .................... 178/18.01–19.07; 345/173–178
See application file for complete search history.

(56) References Cited

U.S. PATENT DOCUMENTS

| | | | | |
|---|---|---|---|---|
| 2008/0158178 | A1* | 7/2008 | Hotelling | G06F 3/044 345/173 |
| 2010/0045632 | A1* | 2/2010 | Yilmaz | G01D 5/2405 345/174 |
| 2013/0141372 | A1* | 6/2013 | Kang | G06F 3/041 345/173 |
| 2013/0278555 | A1* | 10/2013 | Cho | G06F 3/041 345/174 |
| 2015/0084923 | A1* | 3/2015 | Kang | G06F 3/044 345/174 |

\* cited by examiner

*Primary Examiner* — Michael Pervan
(74) *Attorney, Agent, or Firm* — Sughrue Mion, PLLC

(57) ABSTRACT

Disclosed herein are a display device and a manufacturing method thereof, in which a sensing signal generated by touch input is received through at least two receiving channels. The display device includes a touch panel in which a plurality of driving electrodes receive a plurality of driving signals and a plurality of sensing electrodes generate a plurality of sensing signals by a touch input, wherein the driving electrodes and the sensing electrodes are arranged to intersect each other, and a sensing circuit device in which a plurality of receiving channels receive the sensing signals. The sensing circuit device is configured to receive one sensing signal generated by the touch input through at least two receiving channels.

20 Claims, 15 Drawing Sheets

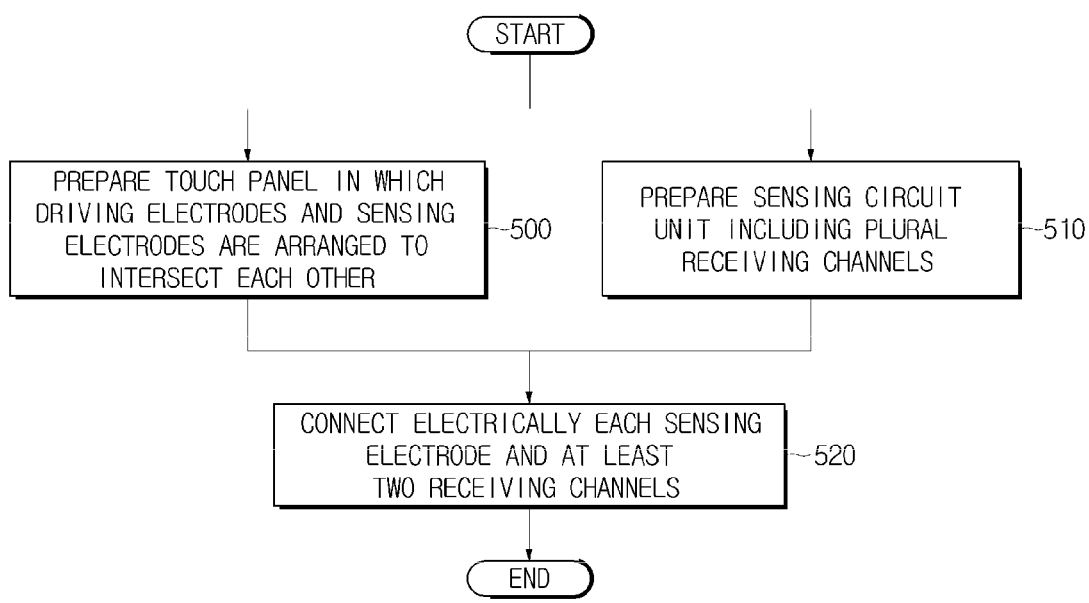

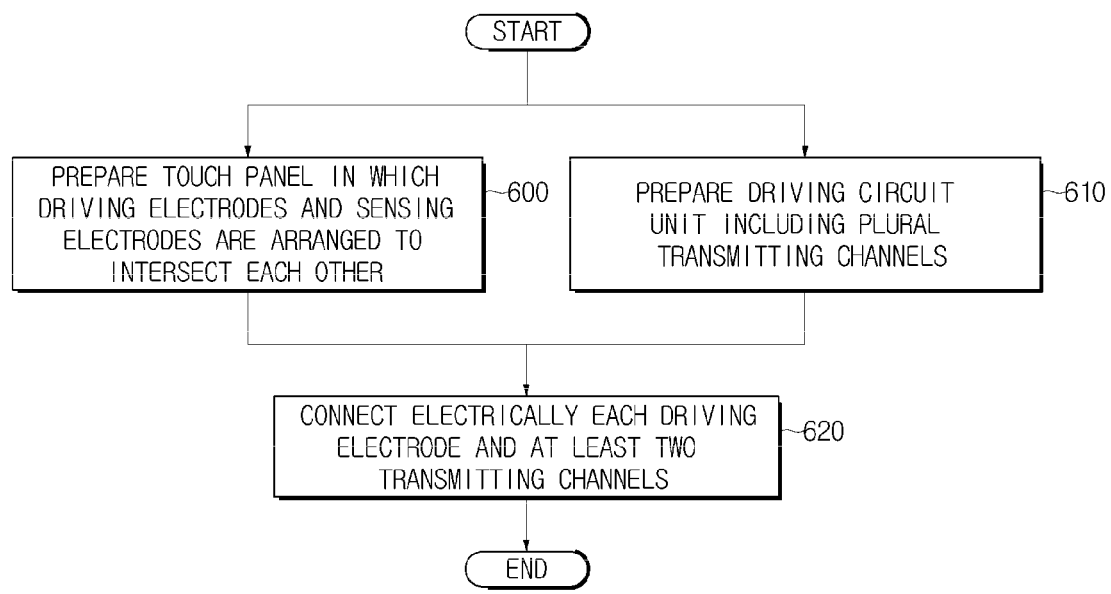

DISPLAY DEVICE AND MANUFACTURING METHOD THEREOF

CROSS-REFERENCE TO RELATED APPLICATION

This application claims priority from Korean Patent Application No. 10-2013-0160683, filed on Dec. 20, 2013 in the Korean Intellectual Property Office, the disclosure of which is incorporated herein by reference.

BACKGROUND

1. Field

Exemplary embodiments relate to a display device to display an image on a screen and a manufacturing method thereof.

2. Description of the Related Art

Display devices of the related art are devices to display a visual stereoscopic image.

Flat display devices of the related art, which have advantages over cathode ray tubes such as a smaller mounting space, decreased weight, decreased volume, higher image quality, easy implementation of a large screen display, and a flat display, have recently been developed.

A touch panel of the related art may be applied to a display device to provide an intuitive input method to a user. A display device of the related art capable of sensing touch input is widely used in various electronic apparatuses such as cell phones, personal digital assistants (PDAs), navigation apparatuses, etc. In particular, with a recent increase in demand for smartphones, demand for display devices which are capable of providing various input methods in a limited form factor by sensing touch input has also increased.

SUMMARY

Exemplary embodiments may provide a display device and a manufacturing method thereof, in which a sensing signal generated by a touch input is received through at least two receiving channels.

Exemplary embodiments will be set forth in part in the description which follows and, in part, will be obvious from the description, or may be learned by practice of the exemplary embodiments.

An aspect of an exemplary embodiment may provide a display device which includes a touch panel in which a plurality of driving electrodes receive a plurality of driving signals and a plurality of sensing electrodes generate a plurality of sensing signals by a touch input, wherein the driving electrodes and the sensing electrodes are arranged to intersect each other, and a sensing circuit device in which a plurality of receiving channels receive the sensing signals. The sensing circuit device is configured to receive one sensing signal generated by the touch input through at least two receiving channels.

A number of the receiving channels of the sensing circuit device may be less than a number of the sensing electrodes.

The sensing circuit device may further include a calculation device configured to detect a plurality of position values which correspond to the at least two receiving channels which receive the one sensing signal.

The calculation device may be further configured such that the at least two receiving channels correspond to the position values in a one-to-one correspondence.

The display device may further include a driving circuit device which includes a plurality of transmitting channels to transmit the driving signals to one driving electrode.

The driving circuit device may be configured to transmit the driving signals to the one driving electrode through at least two transmitting channels.

A number of the transmitting channels of the driving circuit device may be less than a number of the driving electrodes.

Another aspect of an exemplary embodiment may provide a display device manufacturing method which includes preparing a touch panel in which a plurality of driving electrodes receive a plurality of driving signals and a plurality of sensing electrodes generate a plurality of sensing signals by a touch input, wherein the driving electrodes and the sensing electrodes are arranged to intersect each other, preparing a sensing circuit device in which a plurality of receiving channels receive the sensing signals, and electrically connecting the sensing circuit device and the touch panel such that one sensing signal is generated by the touch input and received through at least two receiving channels of the sensing circuit device.

The preparing the sensing circuit device may include preparing the sensing circuit unit device with the receiving channels, wherein a number of the receiving channels is less than a number of the sensing electrodes.

The preparing the sensing circuit device may include preparing a calculation device which is configured to detect a plurality of position values which corresponds to the at least two receiving channels which receive the one sensing signal.

The preparing the calculation device may include preparing the at least two receiving channels which receive the one sensing signal and the position values so as to correspond to each other in a one-to-one correspondence.

The electrically connecting the sensing circuit device and the touch panel may include electrically connecting each of the driving electrodes and at least two receiving channels which correspond with each of the driving electrodes.

The display device manufacturing method may further include preparing a driving circuit device which includes a plurality of transmitting channels to transmit the driving signals to one driving electrode.

The display device manufacturing method may further include electrically connecting the driving circuit device and the touch panel such that the driving signals are transmitted to the one driving electrode through at least two transmitting channels.

The preparing the driving circuit device may include preparing the driving circuit device with the transmitting channels, a number of the transmitting channels is less than a number of the driving electrodes.

Yet another aspect of an exemplary embodiment may provide a display device which includes a touch panel in which a plurality of driving electrodes which extend in an X-axis direction of the touch panel, a plurality of sensing electrodes which extend in a Y-axis direction of the touch panel with the X-axis direction, a driving circuit which applies a plurality of driving signals to the driving electrodes of the touch panel, and a sensing circuit which detects a plurality of capacitive changes from the sensing electrodes.

As is apparent from the above description, since a sensing signal is received through at least two receiving channels, the number of the receiving channels may be reduced. Additionally, complexity of the sensing circuit unit which includes the receiving channels may be lowered. Thus, manufacturing costs may be reduced.

Further, since driving signals are transmitted through at least two transmitting channels, the number of transmitting channels may be reduced. Further, complexity of the driving circuit unit including the transmitting channels may be lowered.

BRIEF DESCRIPTION OF THE DRAWINGS

These and/or other aspects of the exemplary embodiments will become apparent and more readily appreciated from the following description of the embodiments, taken in conjunction with the accompanying drawings of which:

FIG. 9 is a flowchart to explain a display device manufacturing method according to an exemplary embodiment; and FIG. 10 is a flowchart to explain a display device manufacturing method according to another exemplary embodiment.

DETAILED DESCRIPTION OF EXEMPLARY EMBODIMENTS

Figure 1:
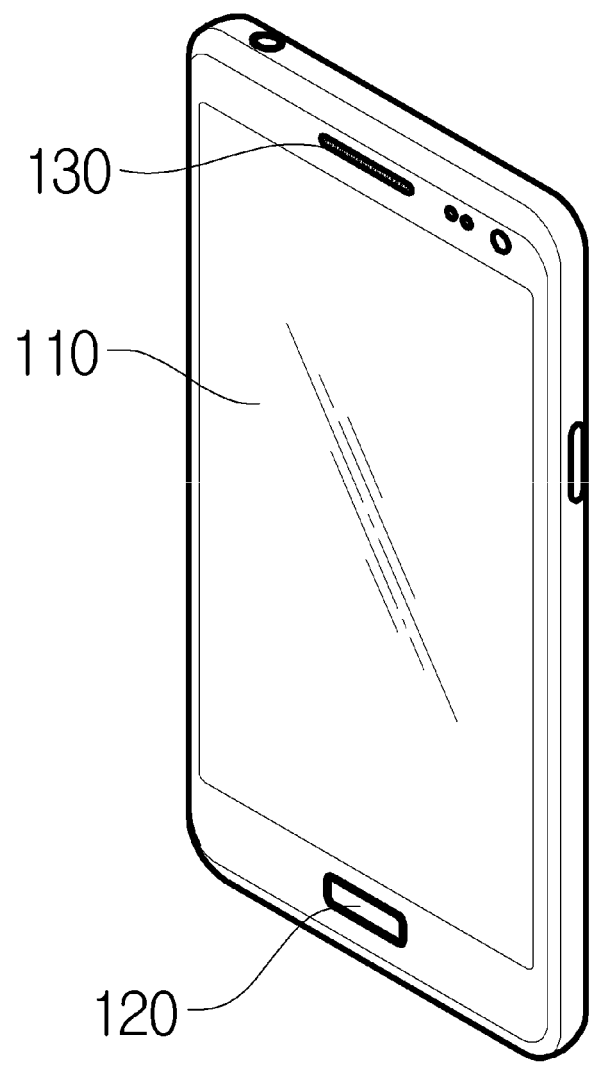
FIG. 1 is a perspective view illustrating an example of an electronic apparatus including a display device according to an exemplary embodiment.

Reference will now be made in detail to the exemplary embodiments, examples of which are illustrated in the accompanying drawings, wherein like reference numerals refer to like elements throughout.

FIG. 1 is a perspective view illustrating an example of an electronic apparatus including a display device according to an exemplary embodiment.

Referring to FIG. 1, an electronic apparatus 100 may include a display device 110 to output an image, an input unit 120, and an audio unit 130 to output sound. The electronic apparatus 100 may also include a touch panel integrated with the display device 110.

As shown in FIG. 1, in the case of a mobile apparatus, a touch panel and a display panel are generally integrally provided with the display device 110, and the touch panel needs to have sufficiently high light transmissivity to transmit the image displayed on the display panel. Therefore, the touch panel may be implemented by forming a sensing electrode using a transparent and electrically conductive material such as indium tin oxide (ITO), indium zinc oxide (IZO), zinc oxide (ZnO), carbon nano tube (CNT), conductive polymer, or graphene on a base substrate formed of a transparent film material such as polyethylene terephthalate (PET), polycarbonate (PC), polyethersulfone (PES), poly-imide (PI), or the like. The sensing electrode may also be implemented as a mesh structure wherein metals having a considerably small line width are densely arranged. The display device may include a wiring pattern disposed in a bezel area thereof, wherein the wiring pattern is connected to the sensing electrode formed of the transparent conductive material. Since the wiring pattern is visually shielded by the bezel area, it may be formed of a metal material such as silver (Ag), copper (Cu), or the like.

The display device 110 including the touch panel may be classified as a resistive-type display device and a capacitive-type display device, depending on the method of sensing touch input. Capacitive-type display devices are increasingly being used, due to advantages such as a relatively long lifespan and a simple implementation of various touch input methods and gestures. In particular, capacitive-type display devices allow for easier implementation of a multi-touch interface as compared with resistive-type display devices. Thus, capacitive-type display devices are widely applied to various apparatuses.

Capacitive-type display devices may be classified as mutual-capacitance type display devices and self-capacitance type display devices, depending on an operational principle. Mutual-capacitance type display devices may implement an accurate multi-touch interface without error. Mutual-capacitance type display devices operate such that a driving signal is sequentially applied to a driving electrode, a sensing electrode adjacent to the driving electrode to which the driving signal is applied is scanned, and a change in capacitance is detected. Thus, a touch input is sensed. Hereinafter, an example of the mutual-capacitance type display devices will be explained with reference to FIGS. 2 and 3.

Figure 2:
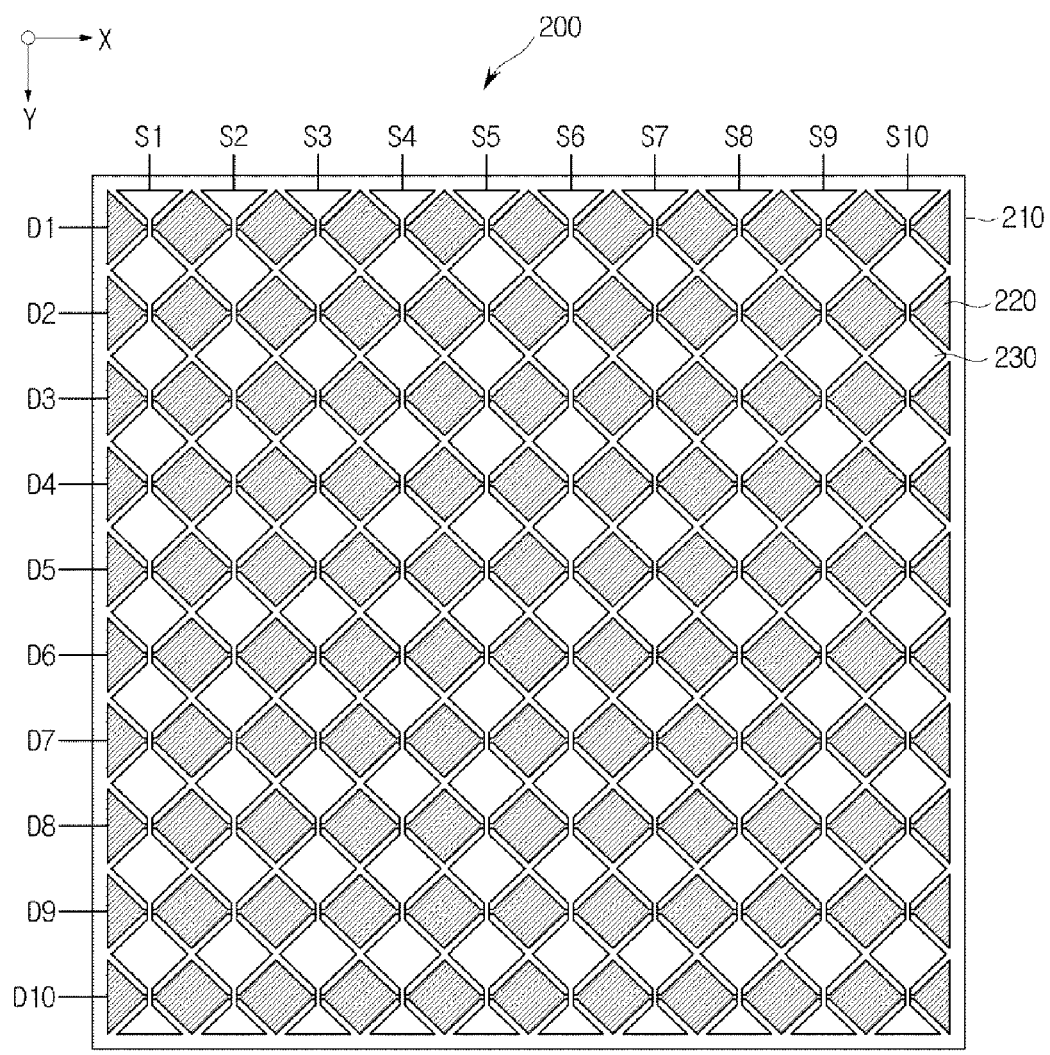
FIG. 2 is a view illustrating a touch panel of the display device according to the exemplary embodiment.

FIG. 2 is a view illustrating a touch panel of the display device according to the exemplary embodiment.

Referring to FIG. 2, the display device 110 according to the exemplary embodiment may include a touch panel 200, a driving circuit unit 300, and a sensing circuit unit 400.

The touch panel 200 may include a substrate 210, a plurality of driving electrodes 220, and a plurality of sensing electrodes 230 provided on the substrate 210. Although not shown in FIG. 2, each of the plurality of driving electrodes 220 and each of the plurality of sensing electrodes 230 may be electrically connected to the wiring pattern of the circuit board attached to an end of the substrate 210 through a wire and a bonding pad.

The substrate 210 may be a transparent substrate in which the driving electrodes 220 and the sensing electrodes 230 can be formed of a plastic material such as polyimide (PI), polymethylmethacrylate (PMMA), polyethyleneterephthalate (PET), or polycarbonate (PC) or tempered glass. Further, apart from an area in which the driving electrodes 220 and the sensing electrodes 230 are formed, a printed circuit may be formed in an area for the wire connected with the driving electrodes 220 and the sensing electrodes 230 on the substrate 210 in order to visually shield the wire.

The plurality of driving electrodes 220 and the plurality of sensing electrodes 230 may be provided on one surface or both surfaces of the substrate 210, and may be formed of a transparent conductive material such as indium tin oxide (ITO), indium zinc oxide (IZO), zinc oxide (ZnO), carbon nano tube (CNT), or a graphene based material. Although the driving electrodes 220 and the sensing electrodes 230 having a rhombus or diamond-shaped pattern are illustrated in FIG. 2, the driving electrodes 220 and the sensing electrodes 230 may have various patterns of polygonal shapes such as a rectangle, a triangle, and the like.

The plurality of driving electrodes 220 may be formed in an X-axis direction, and the plurality of sensing electrodes 230 may be formed in a Y-axis direction. The plurality of driving electrodes 220 and the plurality of sensing electrodes 230 may be provided on both surfaces of the substrate 210, or provided on different substrates to intersect each other. In the case in which both the driving electrodes 220 and the sensing electrodes 230 are provided on one surface of the substrate 210, a predetermined insulating layer may be partially formed at an intersection between the driving electrodes 220 and the sensing electrodes 230.

The driving circuit unit 300 and the sensing circuit unit 400 are mounted to the circuit board of the touch panel 200. Thus, a sensing signal is generated and detected from the plurality of sensing electrodes 230 and sensing touch input.

The driving circuit unit 300 and the sensing circuit unit 400 may be implemented as a single integrated circuit (IC).

Hereinafter, operation of each component to sense touch input will be described in detail with reference to FIG. 3.

Figure 3:
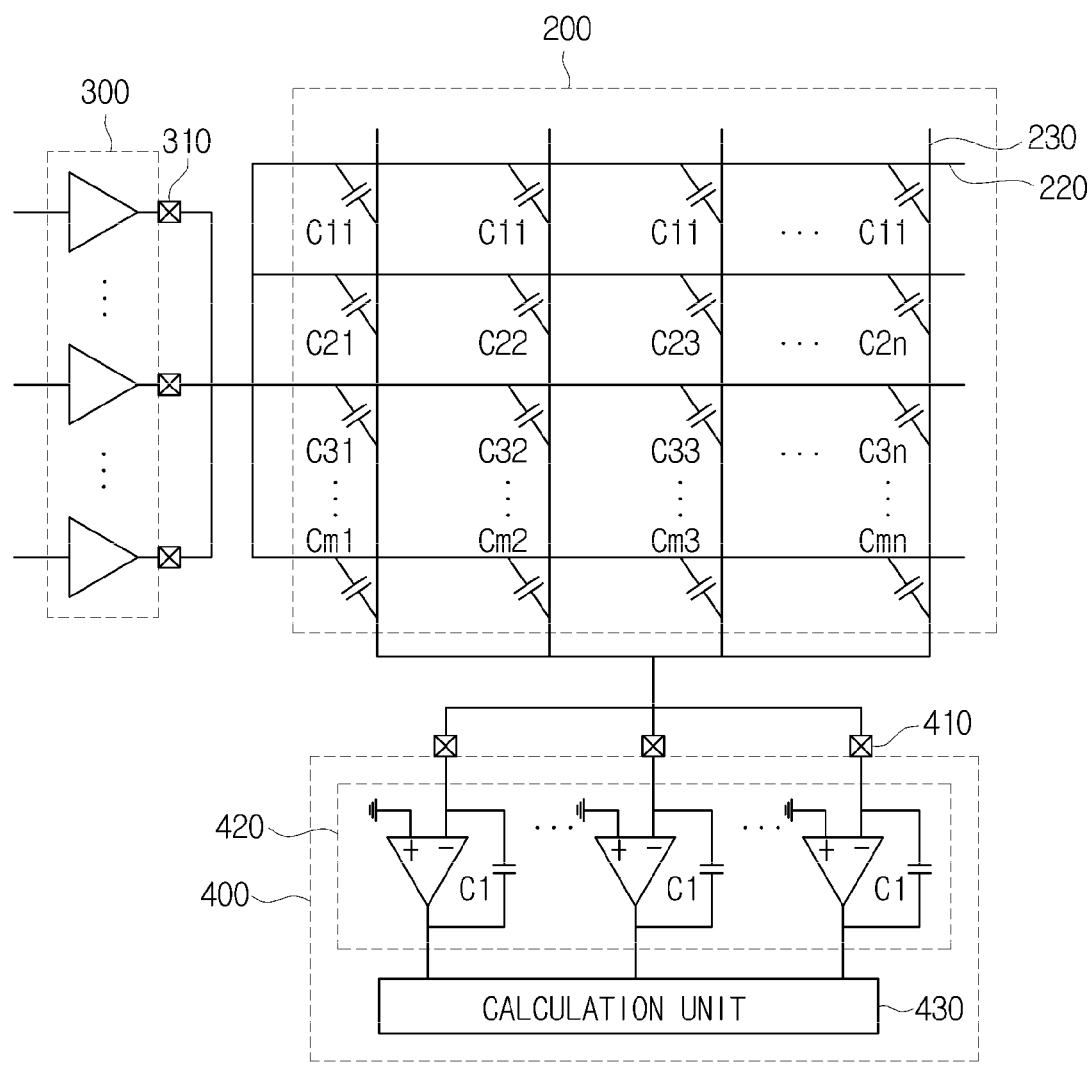
FIG. 3 is a block diagram of the display device including the touch panel according to the exemplary embodiment.

FIG. 3 is a block diagram of the display device including the touch panel according to the exemplary embodiment.

As shown in FIG. 3, the display device according to the embodiment may include a touch panel 200 in which the plurality of driving electrodes 220 to receive driving signals and the plurality of sensing electrodes 230 to generate a sensing signal by touch input intersect each other, and a sensing circuit unit 400 at which a plurality of receiving channels 410 to receive a sensing signal are provided. The display device may further include a driving circuit unit 300 at which a plurality of transmitting channels 310 to transmit driving signals to the plurality of driving electrodes 220 are provided.

The touch panel 200 may include a plurality of driving electrodes 220 extending in an X-axis direction, and a plurality of sensing electrodes 230 extending in a Y-axis direction intersecting with the X-axis. Changes in capacitance C11 through Cmn are generated at intersections of the driving electrodes 220 and the sensing electrodes 230. The changes in capacitance C11 through Cmn may be changes in mutual capacitance which are generated by driving signals applied to the driving electrodes 220.

The driving circuit unit 300 may apply predetermined driving signals to the driving electrodes 220 of the touch panel 200. The driving signals may be a square wave signal, a sine wave signal, a triangle wave signal, or the like, which has a predetermined cycle and amplitude. The driving signal may be sequentially applied to each of the plurality of driving electrodes 220.

The sensing circuit unit 400 may include an integrating circuit 420 to detect changes in capacitance C11 through Cmn from the sensing electrodes 230. The integrating circuit 420 may include at least one operational amplifier and a capacitor C1 having a predetermined capacity. An inverting input terminal of the operational amplifier may be connected to the sensing electrodes 230 to convert the changes in capacitance C11 through Cmn into an analog signal such as a voltage signal or the like, and output the converted signal.

The sensing circuit unit 400 may sense touch input based on the analog signal. Sensing touch input may include detecting the number of touch inputs, a position value where touch input is made, gesture operation, or the like.

The sensing circuit unit 400 may be provided with a plurality of receiving channels 410 to receive a sensing signal from the sensing electrodes 230. The receiving channels 410 may be electrically connected to the sensing electrodes 230 in order to receive a sensing signal. According to connection type, a method of detecting a position value where touch input is made may be varied.

Figure 4A:
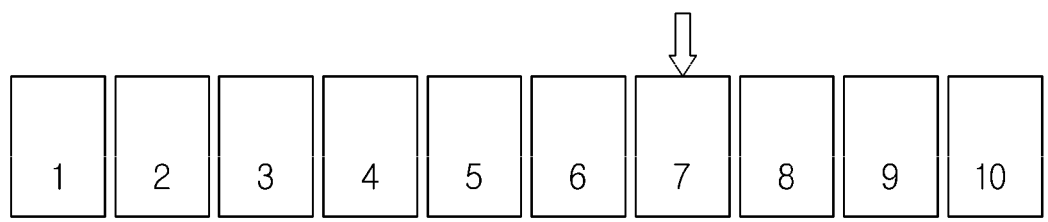
FIGS. 4A through 4C are views to explain a method of detecting a position value at which touch input is made.
Figure 4B:
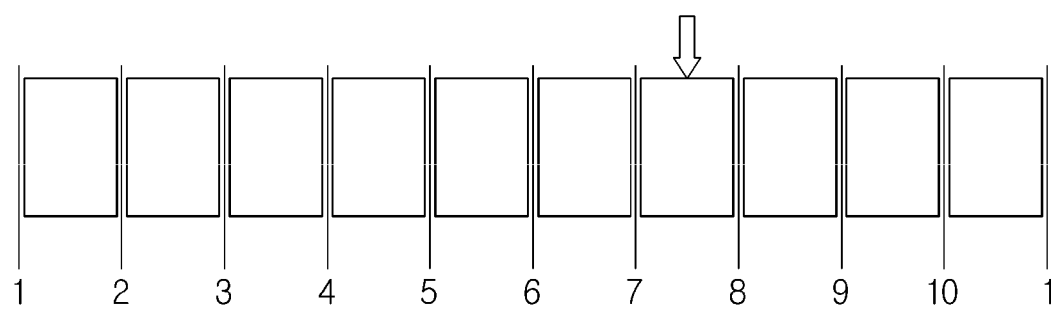
Figure 4C:
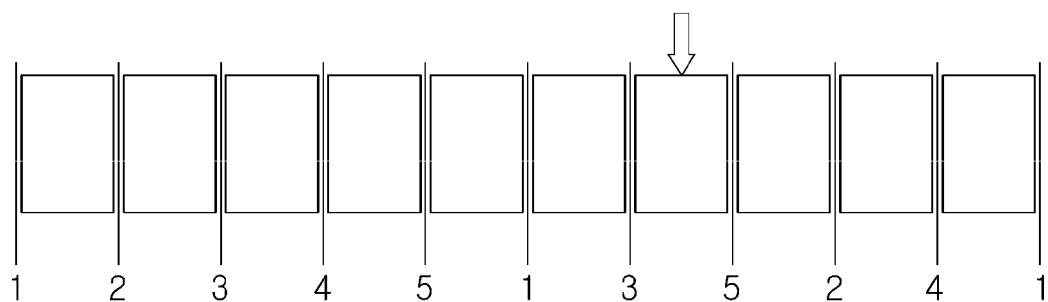

FIGS. 4A through 4C are views to explain a method of detecting a position value where a touch input is made. A position indicated by an arrow refers to a position where the touch input is made.

As shown in FIG. 4A, one position value may be allocated to each position. In this case, the position value corresponding to a position where touch input is made is 7.

In order to realize the method depicted in FIG. 4A, a predetermined eigenvalue is allocated to each of the receiving channels 410. Each of the sensing electrodes 230 and each of the receiving channels 410 are electrically connected to each other in a one-to-one correspondence.

For example, ten sensing electrodes 230 are arranged, and the receiving channels 410 to which eigenvalues from 1 to 10 are allocated and the sensing electrodes 230 may be connected to each other in a one-to-one correspondence. If a touch input is made, a sensing signal is generated from the sensing electrode 230 at which the touch input is made, and is received through the No. 7 receiving channel 410. Thus, the sensing circuit unit 400 may detect the position value 7 corresponding to the position where the touch input is made.

A combination of plural position values may be allocated to each position. For example, FIG. 4B shows that the position value corresponding to the position where touch input is made is between 7 and 8 (hereinafter, referred to as 7-8).

In order to realize this method and similar to the method depicted in FIG. 4A, a predetermined eigenvalue is allocated to each of the receiving channels 410. Each of sensing electrodes 230 is electrically connected to the plural receiving channels 410.

With reference to FIG. 4B, ten sensing electrodes 230 are arranged, and two of the receiving channels 410 to which eigenvalues from 1 to 10 are allocated may be electrically connected to each of the sensing electrodes 230. If the touch input is made, a sensing signal is generated from the sensing electrode 230 at which touch input is made, and is received through the No. 7 and 8 receiving channels 410. Thus, the sensing circuit unit 400 may detect the position value 7-8.

When executing the method depicted in FIG. 4B, the number of the receiving channels 410 may be reduced to be less than the number of the sensing electrodes 230.

Referring to FIG. 4C, a combination of plural position values, e.g., a combination of 1 to 5, may be allocated to each position. For example, FIG. 4C shows that the position value corresponding to the position where touch input is made is 3-5.

The above constitution is sufficiently realized only with five receiving channels 410. As shown in FIG. 4C, if the touch input is made, a sensing signal is generated from the sensing electrode 230 at which touch input is made, and is received through the No. 3 and 5 receiving channels 410. Therefore, the sensing circuit unit 400 may detect the position value 3-5.

Since the plural receiving channels 410 receive the sensing signal generated from one sensing electrode 230 as described above, the number of the receiving channels 410 may be reduced. In the case in which the receiving channels 410 are provided corresponding to the respective sensing electrodes 230, the number of the receiving channels 410 should be the same as the number of the sensing electrodes 230. However, if the sensing circuit unit 400 is constituted to receive a sensing signal using a combination of plural receiving channels 410, a smaller number of receiving channels 410 than the number of the sensing electrodes 230 may be provided. Thus, a proper number of receiving channels 410 may be provided by finding the minimum number of receiving channels 410.

The minimum number of receiving channels 410 may be determined by the number of the sensing electrodes 230 and the number of the receiving channels 410 receiving one sensing signal. In particular, the minimum number n of receiving channels 410 satisfies the following Equation 1 below:

$$_{n-1}C_r \leq K \leq {_nC_r}$$

Equation 1

In equation 1, r refers to the number of the receiving channels 410 receiving one sensing signal, and K refers to the number of the sensing electrodes 230.

For example, in the case in which two receiving channels 410 receive one sensing signal and ten sensing electrodes 230 are provided, r is 2 and K is 10. If these figures are substituted into Equation 1, the value of n satisfying Equation 1 is 5. In other words, in the case in which two receiving channels 410 receive a sensing signal generated from any one of ten sensing electrodes 230, the minimum number of receiving channels 410 to be provided may be 5.

As the number of the receiving channels 410 is decreased, the number of integrating circuits 420 connected to the receiving channels 410 is decreased. Thus, circuit complexity and manufacturing costs may be lowered.

The method of receiving one sensing signal through the plural receiving channels 410 has been described. Similar to this method, driving signals may be transmitted from plural transmitting channels 310 to one driving electrode 220.

To achieve one driving electrode 220, each of the driving electrodes 220 may be electrically connected to the plural transmitting channels 310. Combinations of transmitting channels 310 connected to the respective driving electrodes 220 may be different from each other.

A method of connecting each of the driving electrodes 220 to the plural transmitting channels 310 while minimizing the number of the transmitting channels 310 is identical to the method described above with reference to FIGS. 4A through 4C.

Each of the transmitting channels 310 may be electrically connected to each of the driving electrodes 220, and a transmitting signal may be transmitted to the specific driving electrode 220 using the transmitting channel 310 connected thereto. However, in this case, the transmitting channels 310 may be provided as many as the number of the driving electrodes 220. Accordingly, circuit complexity may be increased.

For this reason, in order to reduce circuit complexity, the number of the transmitting channels 310 and the number of the receiving channels 410 should be minimized.

Figure 5:
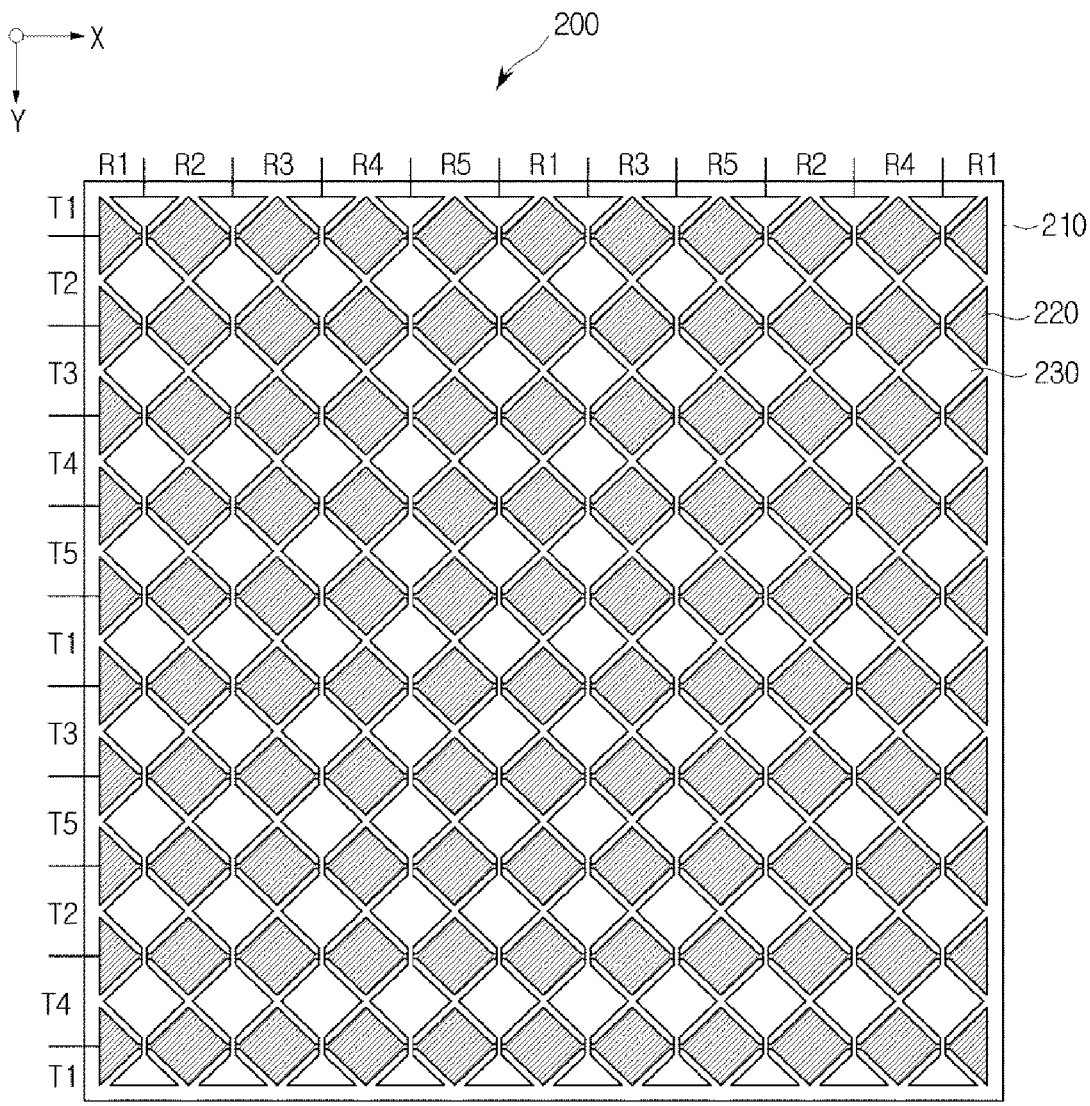
FIG. 5 is a view illustrating the display device, wherein one sensing signal is received through two receiving channels, according to the exemplary embodiment.

FIG. 5 is a view illustrating an example of the display device wherein two receiving channels receive one sensing signal.

Five receiving channels 410 of the sensing circuit unit 400 may be electrically connected to ten sensing electrodes 230. In contrast to the case in which each of the sensing electrodes 230 is connected to each of the receiving channels 410 (S1 through S10) in a one-to-one correspondence, FIG. 5 shows that each of the sensing electrodes 230 is connected to two of the receiving channels 410 (R1 through R5). Therefore, the sensing signal generated from one sensing electrode 230 may be received through two receiving channels 410.

Combinations of receiving channels 410 connected to the respective sensing electrodes 230 may be different from each other. This is because the sensing electrode 230, generating a sensing signal, may be detected through the combination of receiving channels 410 receiving the sensing signal and a position, where touch input is made, may be detected thereon.

Referring to FIG. 5, each of the sensing electrodes 230 is connected to two receiving channels 410. When the leftmost sensing electrode 230 is represented by 1 and the rightmost sensing electrode 230 is represented by 10, the combinations of receiving channels 410 connected to the respective sensing electrodes 230 are shown in Table 1 below:

TABLE 1

| Sensing Electrodes | Receiving Channels |
|---|---|
| 1 | R1-R2 |
| 2 | R2-R3 |
| 3 | R3-R4 |
| 4 | R4-R5 |
| 5 | R5-R1 |
| 6 | R1-R3 |
| 7 | R3-R5 |
| 8 | R5-R2 |
| 9 | R2-R4 |
| 10 | R4-R1 |

Based on Table 1, a method of receiving one sensing signal through two receiving channels 410 will now be described.

Figure 6A:
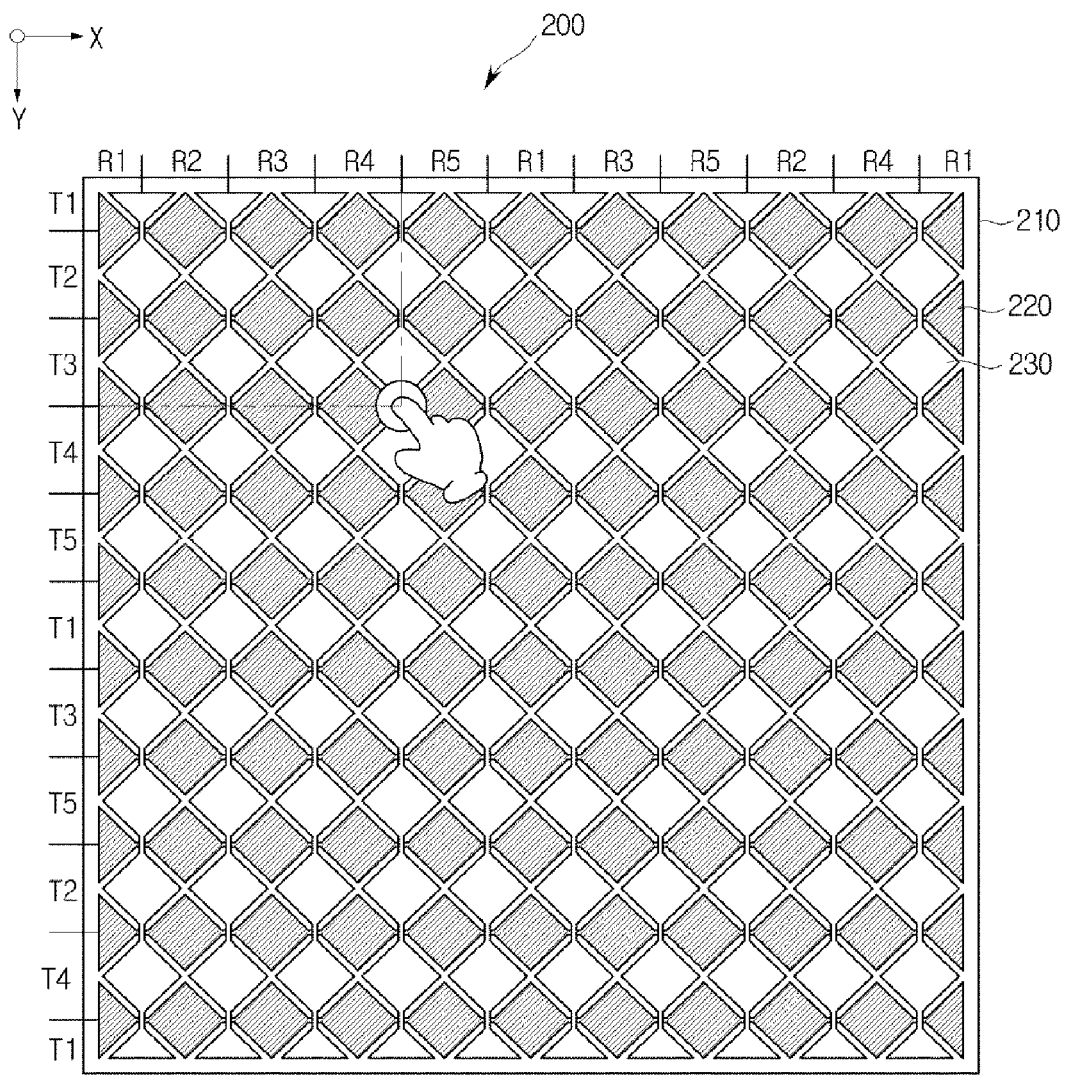
FIGS. 6A and 6B are views to explain a method of receiving one sensing signal through two receiving channels.
Figure 6B:
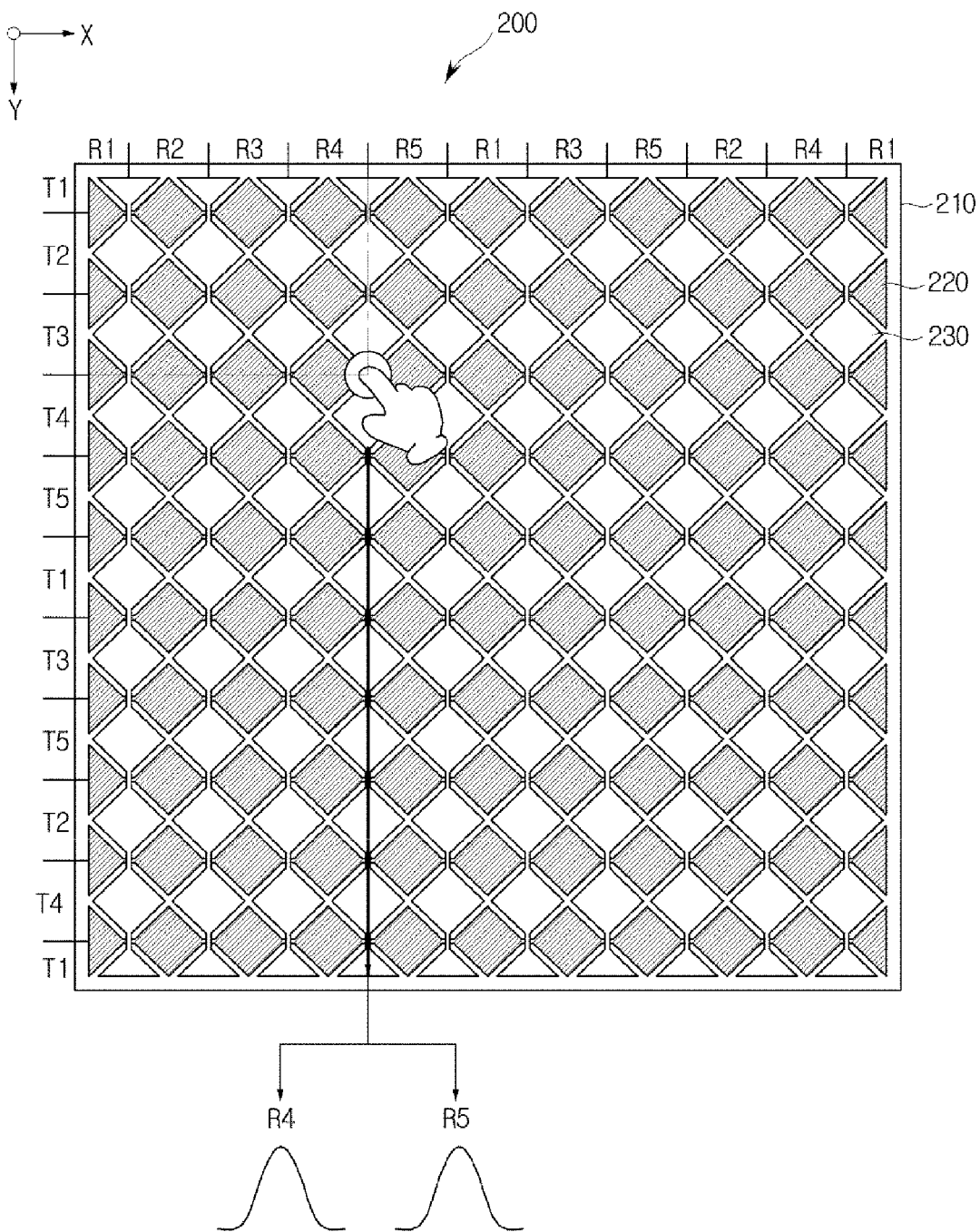

FIGS. 6A and 6B are views to explain a method of receiving one sensing signal through two receiving channels.

As shown in FIG. 6A, if a user makes touch input at a specific position of the touch panel 200, a sensing signal may be generated from the sensing electrode 230 at which touch input is made. The sensing electrode 230 generating the sensing signal is the 4$^{th}$ sensing electrode from the left in FIG. 6A. The sensing signal generated from the sensing electrode 230 may be transmitted to the receiving channel 410 corresponding thereto.

According to Table 1, the sensing signal generated from the 4$^{th}$ sensing electrode 230 from the left may be received through the receiving channel 410 (R4) and the receiving channel 410 (R5). As shown in FIG. 6B, the receiving channels 410 (R4 and R5) may receive a sensing signal having the same waveform. The sensing circuit unit 400 may detect that the sensing signal is generated from the 4$^{th}$ sensing electrode 230 from the left based on the combination of receiving channels 410 receiving the sensing signal. Accordingly, the sensing circuit unit 400 may detect a position value at which touch input is made.

Referring to FIG. 5, five transmitting channels 310 of the driving circuit unit 300 may be electrically connected to ten driving electrodes 220. In contrast to the case in which each of the driving electrodes 220 is connected to each of the transmitting channels 310 (D1 through D10) in a one-to-one correspondence, FIGS. 6A-6B show that each of the driving electrodes 220 is connected to two of the transmitting channels 310 (T1 through T5). Therefore, the driving signals may be transmitted to one driving electrode 220 from two transmitting channels 310.

Combinations of transmitting channels 310 connected to the respective driving electrodes 220 may be different from each other. If the driving signals are transmitted from different combinations of transmitting channels 310, the driving signals may be supplied to the driving electrode 220 corresponding to each combination.

Referring to FIGS. 6A-6B, each of the driving electrodes 220 is connected to two transmitting channels 310. When the uppermost driving electrode 220 is represented by 1 and the lowermost driving electrode 220 is represented by 10, the combinations of transmitting channels 310 connected to the respective driving electrodes 220 are shown in Table 2 below:

TABLE 2

| Driving Electrodes | Transmitting Channels |
|---|---|
| 1 | T1-T2 |
| 2 | T2-T3 |
| 3 | T3-T4 |
| 4 | T4-T5 |
| 5 | T5-T1 |
| 6 | T1-T3 |
| 7 | T3-T5 |
| 8 | T5-T2 |
| 9 | T2-T4 |
| 10 | T4-T1 |

Based on Table 2, a method of transmitting one driving signal from two transmitting channels will now be described.

Figure 7A:
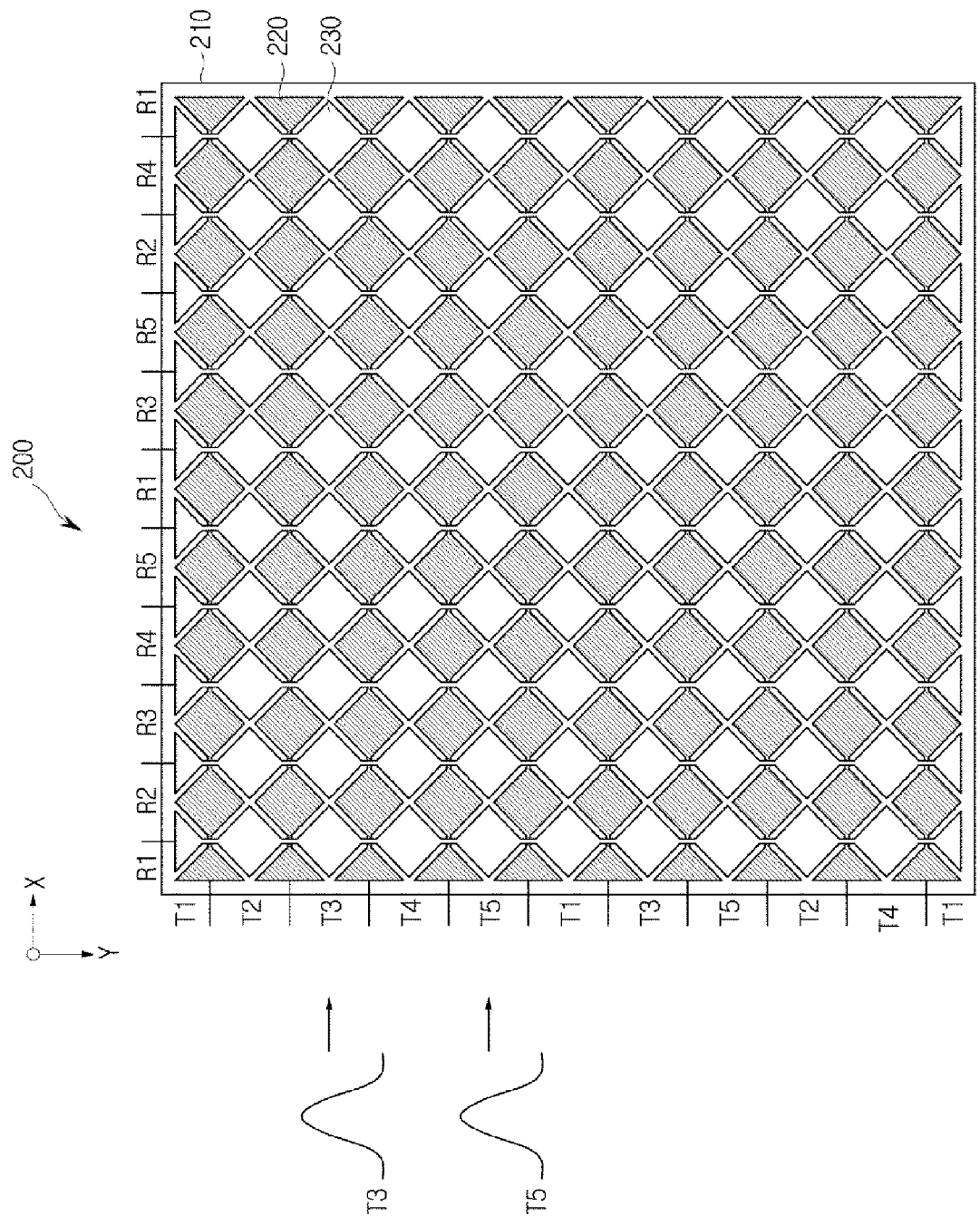
FIGS. 7A and 7B are views to explain a method of transmitting driving signals to one driving electrode through two transmitting channels.
Figure 7B:
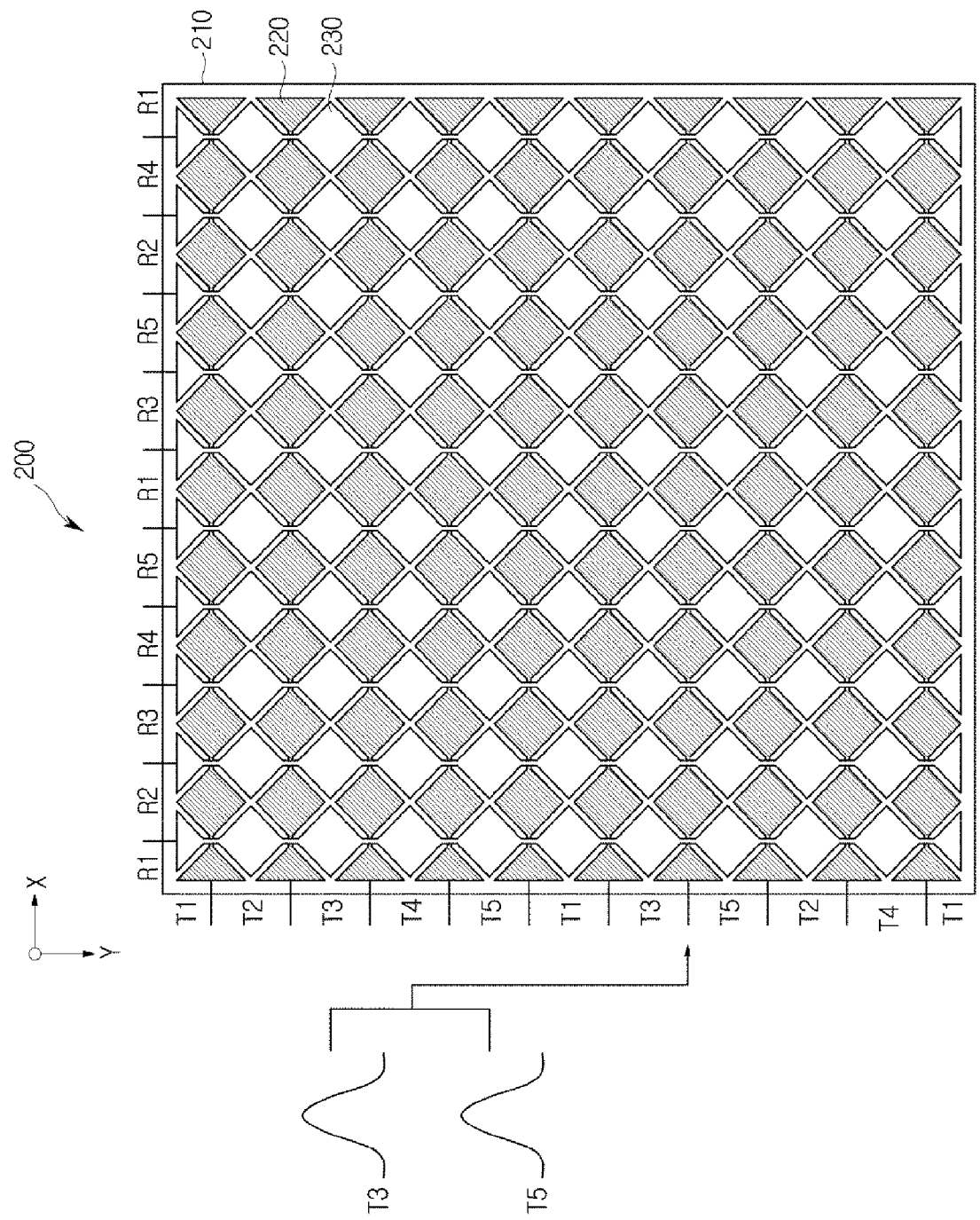

FIGS. 7A and 7B are views to explain a method of transmitting driving signals from two transmitting channels to one driving electrode.

The transmitting channels T3 and T5 may transmit driving signals. In particular, the transmitting channels T3 and T5 may transmit driving signals having the same waveform at the same time. The driving signals may be transmitted to the driving electrode 220 corresponding to the combination of transmitting channels 310 transmitting the driving signal.

Referring to Table 2, the driving signals generated from the transmitting channels T3 and T5 may be transmitted to the 7th driving electrode 220. As such, the driving signals may be sequentially transmitted to the respective driving electrodes 220 by varying the combinations of transmitting channels 310.

Using the above method, the number of the transmitting channels 310 as well as the number of the receiving channels 410 may be reduced. Thus, complexity of the driving circuit unit 300 may be lowered.

Referring to FIG. 3, the sensing circuit unit 400 may further include a calculation unit 430 which detects position values corresponding to at least two receiving channels 410 receiving a sensing signal. As described above, the sensing signal received by the receiving channels 410 is output as an analog signal through the integrating circuit 420. The calculation unit 430 detects at least two receiving channels 410 outputting an analog signal, and detects the sensing electrode 230 corresponding to the combination of receiving channels 410.

For example, Table 1 may be pre-stored in the calculation unit 430. The calculation unit 430 detects the combination of receiving channels 410 receiving the sensing signal, and detects the corresponding sensing electrode 230 with reference to Table 1. Based on the detection, a position value corresponding to the position where touch input is made is detected.

As described above with reference to FIG. 2, the driving circuit unit 300 and the sensing circuit unit 400 may be implemented as a single integrated circuit.

Figure 8A:
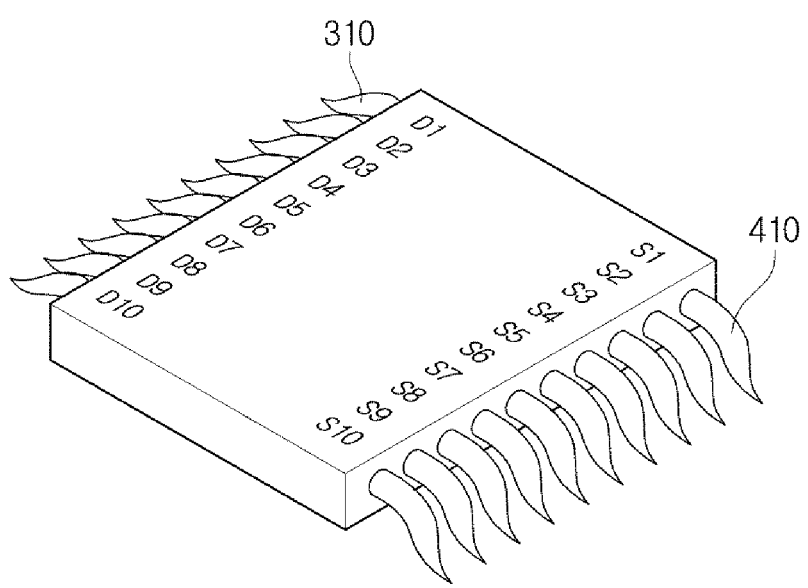
FIGS. 8A and 8B are views illustrating examples of IC chips in which an integrated circuit including a driving circuit unit and a sensing circuit unit is mounted.
Figure 8B:
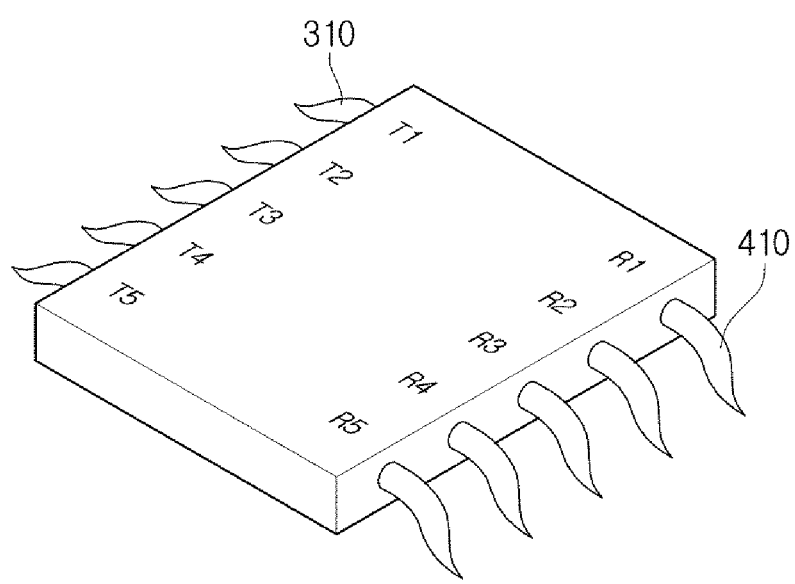

FIGS. 8A and 8B are views illustrating examples of integrated circuit (IC) chips in which an integrated circuit including the driving circuit unit and the sensing circuit unit is mounted.

The exemplary IC chips illustrated in FIGS. 8A and 8B are such that the driving circuit unit 300 and the sensing circuit unit 400 are mounted therein and the transmitting channels 310, which transmit driving signals to the outside, and the receiving channels 410, which receive sensing signals, are exposed. Further, the IC chips illustrated in FIGS. 8A and 8B are configured to be connected to ten driving electrodes 220 and ten sensing electrodes 230.

In the case of the IC chip illustrated in FIG. 8A, the IC chip includes ten transmitting channels 310 (D1 through D10). In order to transmit a driving signal to each of the driving electrodes 220, each of the transmitting channels 310 is connected to each of the driving electrodes 220 in a one-to-one correspondence.

The IC chip illustrated in FIG. 8A further includes ten receiving channels 410 (S1 through S10). Similar to the transmitting channels 310, in order to receive a sensing signal from each of the sensing electrodes 230, each of the receiving channels 410 is connected to each of the sensing electrodes 230 in a one-to-one correspondence.

However, the transmitting channels 310 and the receiving channels 410 have a same number as the number of the driving electrodes 220 and sensing electrodes 230. Thus, complexity of the driving circuit unit 300 and the sensing circuit unit 400 in the IC chip is increased.

The IC chip illustrated in FIG. 8B may include five transmitting channels 310 (T1 through T5) and five receiving channels 410 (R1 through R5).

If driving signals are transmitted from two transmitting channels 310 to one driving electrode 220, it is possible to implement the IC chip by using combinations of two for the five transmitting channels 310. Also, if two receiving channels 410 receive a sensing signal from one sensing electrode 230, it is possible to sense a position where touch input is made by combinations of two for the five receiving channels 410.

FIG. 9 is a flowchart to explain a display device manufacturing method according to an exemplary embodiment.

First, the touch panel 200 is prepared, in which the driving electrodes 220 and the sensing electrodes 230 are arranged to intersect each other (operation 500). The driving electrodes 220 may be configured to receive driving signals and provided in plural. The sensing electrodes 230 may be configured to generate sensing signals and provided in plural.

By the plural driving electrodes 220 and the plural sensing electrodes 230 intersecting each other, capacitance may be generated at plural positions on the touch panel 200. Touch input may be sensed using a change in each capacitance by touch input.

Together with the touch panel 200, the sensing circuit unit 400 including the plural receiving channels 410 may be prepared (operation 510). The sensing circuit unit 400 may receive a sensing signal generated from the sensing electrode 230, detect the sensing electrode 230 generating the sensing signal of the plural sensing electrodes 230, and detect a position where touch input is made based thereon.

The receiving channels 410 may be electrically connected to the sensing electrodes 230. At this time, the number of the receiving channels 410 is less than the number of the sensing electrodes 230. As the number of the receiving channels 410 is decreased, complexity of the sensing circuit unit 400 and manufacturing costs may be lowered.

After the touch panel 200 and the sensing circuit unit 400 are prepared, the sensing electrodes 230 of the touch panel 200 and the receiving channels 410 of the sensing circuit unit 400 may be electrically connected to each other.

In particular, each of the sensing electrodes 230 and at least two receiving channels 410 may be electrically connected (operation 520). Since the number of the receiving channels 410 is less than the number of the sensing electrodes 230, a combination of at least two receiving channels 410 may correspond to each of the sensing electrodes 230 to be electrically connected to each sensing electrode. By detecting the combination of receiving channels 410 receiving a sensing signal, the sensing electrode 230 corresponding thereto may be detected. As a result, a position where touch input is made may be detected.

FIG. 10 is a flowchart to explain a display device manufacturing method according to another exemplary embodiment.

Similar to FIG. 9, the display device in FIG. 10 may be constituted such that at least two driving signals are transmitted to one driving electrode 220.

Similar to FIG. 9, the touch panel 200 is prepared, in which the driving electrodes 220 and the sensing electrodes 230 are arranged to intersect each other (operation 600).

Together with the touch panel 200, the driving circuit unit 300 including the plural transmitting channels 310 may be prepared (operation 610). The driving circuit unit 300 may transmit driving signals to the driving electrodes 220 so that capacitance is generated at plural positions on the touch panel 200.

The transmitting channels 310 may be electrically connected to the driving electrodes 220. At this time, the number of the transmitting channels 310 is less than the number of the driving electrodes 220. Similar to the sensing circuit unit 400, as the number of the transmitting channels 310 is decreased, complexity of the driving circuit unit 300 and manufacturing costs may be lowered.

After the touch panel 200 and the driving circuit unit 300 are prepared, the driving electrodes 220 of the touch panel 200 and the transmitting channels 310 of the driving circuit unit 300 may be electrically connected to each other.

In particular, each of the driving electrodes 220 and at least two transmitting channels 310 may be electrically connected (operation 620). Since the number of the transmitting channels 310 is less than the number of the driving electrodes 220, a combination of at least two transmitting channels 310 may correspond to each of the driving electrodes 220 to be electrically connected to each driving electrode. According to the combination of the transmitting channels 310 used to transmit driving signals, the driving electrode 220 to receive the driving signals is determined. Accordingly, driving signals may be sequentially transmitted to the respective driving electrodes 220 by varying the combinations of transmitting channels 310.

Although a few exemplary embodiments have been shown and described, it would be appreciated by those skilled in the art that changes may be made in these embodiments without departing from the principles and spirit of the exemplary embodiments, the scope of which is defined in the claims and their equivalents.

What is claimed is:

1. A display device comprising:
   a touch panel in which a plurality of driving electrodes receive a plurality of driving signals and a plurality of sensing electrodes generate a plurality of sensing signals by a touch input, wherein the driving electrodes and the sensing electrodes are arranged to intersect each other; and
   a sensing circuit device in which a plurality of receiving channels receive the sensing signals,
   wherein the sensing circuit device is configured to receive one sensing signal generated by the touch input through at least two receiving channels,
   wherein each of the plurality of sensing electrodes is connected to a different combination of the receiving channels, each different combination are pairs of receiving channels, wherein the pairs include non-sequential channels, and wherein the combination includes sensing electrodes disposed next to each other connected to the pairs of non-sequential channels.

2. The display device according to claim 1, wherein a number of the receiving channels of the sensing circuit device is less than a number of the sensing electrodes.

3. The display device according to claim 1, wherein the sensing circuit device further comprises a calculation device configured to detect a position on the touch panel which correspond to the at least two receiving channels which receive the one sensing signal.

4. The display device according to claim 3, wherein the calculation device is further configured such that the at least two receiving channels correspond to the position on the touch panel in a one-to-one correspondence.

5. The display device according to claim 1, further comprising:
   a driving circuit device which comprises a plurality of transmitting channels to transmit the driving signals to one driving electrode.

6. The display device according to claim 5, wherein the driving circuit device is configured to transmit the driving signals to the one driving electrode through at least two transmitting channels.

7. The display device according to claim 5, wherein a number of the transmitting channels of the driving circuit device is less than a number of the driving electrodes.

8. The display device according claim 1, wherein each of the plurality of sensing electrodes is connected to the different combination of integrating circuits through the different combination of the receiving channels.

9. A display device manufacturing method, comprising:
   preparing a touch panel in which a plurality of driving electrodes receive a plurality of driving signals and a plurality of sensing electrodes generate a plurality of sensing signals by a touch input, wherein the driving electrodes and the sensing electrodes are arranged to intersect each other;
   preparing a sensing circuit device in which a plurality of receiving channels receive the sensing signals; and
   electrically connecting the sensing circuit device and the touch panel such that one sensing signal is generated by the touch input and received through at least two receiving channels of the sensing circuit device,
   wherein each of the plurality of sensing electrodes is connected to a different combination of the receiving channels, each different combination are pairs of receiving channels, wherein the pairs include non-sequential channels, and wherein the combination includes sensing electrodes disposed next to each other connected to the pairs of non-sequential channels.

10. The display device manufacturing method according to claim 9, wherein the preparing the sensing circuit device comprises preparing the sensing circuit device with the receiving channels,
    wherein a number of the receiving channels is less than a number of the sensing electrodes.

11. The display device manufacturing method according to claim 9, wherein the preparing the sensing circuit device comprises preparing a calculation device which is configured to detect a position on the touch panel which corresponds to the at least two receiving channels which receive the one sensing signal.

12. The display device manufacturing method according to claim 11, wherein the preparing the calculation device comprises preparing the at least two receiving channels which receive the one sensing signal and the position on the touch panel so as to correspond to each other in a one-to-one correspondence.

13. The display device manufacturing method according to claim 9, wherein the electrically connecting the sensing circuit device and the touch panel comprises electrically connecting each of the driving electrodes and at least two receiving channels which correspond with each of the driving electrodes.

14. The display device manufacturing method according to claim 9, further comprising:
preparing a driving circuit device which comprises a plurality of transmitting channels to transmit the driving signals to one driving electrode.

15. The display device manufacturing method according to claim 14, further comprising:
electrically connecting the driving circuit device and the touch panel such that the driving signals are transmitted to the one driving electrode through at least two transmitting channels.

16. The display device manufacturing method according to claim 14, wherein the preparing the driving circuit device comprises preparing the driving circuit device with the transmitting channels,
wherein a number of the transmitting channels is less than a number of the driving electrodes.

17. A display device including a touch panel, the display device comprising:
a plurality of driving electrodes which extend in an X-axis direction of the touch panel;
a plurality of sensing electrodes which extend in a Y-axis direction of the touch panel and intersect with the X-axis direction; a driving circuit configured to apply a plurality of driving signals to the driving electrodes of the touch panel; and
a sensing circuit, having a plurality of receiving channels, configured to detect a plurality of capacitive changes from the sensing electrodes,
wherein each of the plurality of sensing electrodes is connected to different combination of the receiving channels, each different combination are pairs of receiving channels, wherein the pairs include non-sequential channels, and wherein the combination includes sensing electrodes disposed next to each other connected to the pairs of non-sequential channels.

18. The display device according to claim 17, wherein the driving signals comprise a predetermined cycle and amplitude.

19. The display device according to claim 17, wherein the sensing circuit comprises at least one operational amplifier and a capacitor.

20. The display device according to claim 17, wherein the capacitive changes are generated at intersections of the driving electrodes and the sensing electrodes.

* * * * *